(12) United States Patent
Baldwin et al.

(10) Patent No.: US 11,588,268 B1
(45) Date of Patent: *Feb. 21, 2023

(54) EXTENDABLE ELECTRICAL OUTLET ENCLOSURE

(71) Applicants: Jeffrey P. Baldwin, Anthem, AZ (US); John E. Klein, Chandler, AZ (US)

(72) Inventors: Jeffrey P. Baldwin, Anthem, AZ (US); John E. Klein, Chandler, AZ (US)

(73) Assignee: Titan3 Technology LLC, Tempe, AZ (US)

( * ) Notice: Subject to any disclaimer, the term of this patent is extended or adjusted under 35 U.S.C. 154(b) by 41 days.

This patent is subject to a terminal disclaimer.

(21) Appl. No.: 17/348,615

(22) Filed: Jun. 15, 2021

Related U.S. Application Data

(63) Continuation of application No. 16/694,659, filed on Nov. 25, 2019, now Pat. No. 11,038,300.

(60) Provisional application No. 62/772,110, filed on Nov. 28, 2018.

(51) Int. Cl.
  *H01R 13/44* (2006.01)
  *H01R 13/512* (2006.01)
  *H01R 13/52* (2006.01)
  *H01R 13/72* (2006.01)

(52) U.S. Cl.
  CPC ....... *H01R 13/512* (2013.01); *H01R 13/5213* (2013.01); *H01R 13/72* (2013.01)

(58) Field of Classification Search
  CPC .... H01R 13/502; H01R 13/512; H01R 13/52; H01R 13/5213; H01R 13/72
  USPC .......................................... 439/135, 136, 142
  See application file for complete search history.

(56) References Cited

U.S. PATENT DOCUMENTS

| | | | |
|---|---|---|---|
| 2,886,630 A | 5/1959 | Gill | |
| 3,027,416 A | 3/1962 | Kissel | |
| 3,064,850 A | 11/1962 | Kelly, Jr. | |
| 3,956,573 A | 5/1976 | Myers | |
| 4,059,321 A | 11/1977 | Rasmussen | |
| 4,228,317 A | 10/1980 | Cziment | |
| 5,021,608 A | 6/1991 | Hadfield | |
| 5,541,362 A | 7/1996 | Reinert, Sr. | |
| 5,671,531 A | 9/1997 | Mugiya | |
| 5,783,774 A | 7/1998 | Bowman | |
| 8,921,712 B1 | 12/2014 | Gretz | |
| 10,283,951 B1 | 5/2019 | Gretz | |
| 10,559,915 B1 * | 2/2020 | Pahulje | H01R 13/5216 |
| 10,938,194 B1 | 3/2021 | Holleschau | |

(Continued)

*Primary Examiner* — Khiem M Nguyen
(74) *Attorney, Agent, or Firm* — Booth Udall Fuller, PLC; Kenneth C. Booth (57) ABSTRACT

An extendable electrical outlet enclosure with a tubular main body, a bezel, a cap, at least one extension tube, and a back plate. The tubular main body has a first end, a second end, and a wall extending between the first end and second end. The tubular main body also has an electrical device support that extends inward from the wall and defines a separation between an electrical plug section and a wiring section. The bezel surrounds an opening in the main body at the first end and allows the cap to removably mount to the electrical enclosure. The at least one extension tube attaches to the tubular main body at the second end and has a leading end, a trailing end, and an outer wall extending between the leading end and the trailing end. The back plate couples with the at least one extension tube at the trailing end.

20 Claims, 7 Drawing Sheets

(56) References Cited

U.S. PATENT DOCUMENTS

| | | | |
|---|---|---|---|
| 11,038,300 B1* | 6/2021 | Baldwin | ............ H01R 13/5213 |
| 2002/0096350 A1 | 7/2002 | Young | |
| 2003/0109172 A1 | 6/2003 | Foden | |
| 2004/0175975 A1* | 9/2004 | Drane | ................ H01R 13/5213 |
| | | | 439/138 |
| 2004/0242060 A1* | 12/2004 | Plzak | .................... H01R 27/02 |
| | | | 439/535 |
| 2005/0042915 A1* | 2/2005 | Hsiao | .................... H01R 13/72 |
| | | | 439/528 |
| 2006/0027386 A1 | 2/2006 | Drane | |
| 2006/0065422 A1* | 3/2006 | Broyles | ................ H01R 13/639 |
| | | | 174/53 |
| 2009/0194323 A1 | 8/2009 | Jolly | |
| 2009/0218128 A1 | 9/2009 | Carbone | |
| 2011/0005799 A1 | 1/2011 | Drane | |
| 2011/0228552 A1 | 9/2011 | Kevelos | |
| 2015/0171572 A1 | 6/2015 | Carbone | |
| 2015/0264827 A1 | 9/2015 | Hantschel | |
| 2016/0352087 A1 | 12/2016 | Wurms | |
| 2019/0058315 A1 | 2/2019 | Korcz | |
| 2019/0310052 A1 | 10/2019 | Krausz | |
| 2020/0036174 A1 | 1/2020 | Diakomis | |
| 2020/0052432 A1 | 2/2020 | Byrne | |
| 2020/0052471 A1 | 2/2020 | Byrne | |
| 2020/0412070 A1 | 12/2020 | Owen | |
| 2022/0006274 A1 | 1/2022 | Beristany | |

* cited by examiner

EXTENDABLE ELECTRICAL OUTLET ENCLOSURE

CROSS REFERENCE TO RELATED APPLICATIONS

This application is a continuation of earlier U.S. Utility patent application Ser. No. 16/694,659, filed Nov. 25, 2019, and issuing as U.S. patent Ser. No. 11/038,300 on Jun. 15, 2021, which application claims the benefit of U.S. Provisional Patent Application No. 62/772,110, filed Nov. 28, 2018, the disclosures of which is hereby incorporated herein by this reference.

TECHNICAL FIELD

Aspects of this document relate generally to an extendable electrical outlet enclosure.

BACKGROUND

Electrical outlet enclosures are used to contain an electrical outlet and its wiring. Electrical enclosures help to keep the outlet free of water, direct, and other contaminants. In addition, the electrical enclosure provides a layer of separation between electrical wiring and the materials surrounding the electrical outlet. This reduces the risk of fire or electrical shock as a result of contact with the electrical wiring. However, in each situation in which an outlet is used, there may be differing amounts of electrical wiring that need to be contained within the electrical enclosure. A need exists for electrical outlet enclosures that are extendable to accommodate different amounts of wiring while still providing the benefits of an electrical outlet enclosure expressed above.

SUMMARY

Aspects of this document relate to electrical outlet enclosures which may comprise a tubular main body having a first end and a second end opposite the first end, the main body having an electrical device support extending inward from a wall of the main body between the first end and the second end, the electrical device support defining a separation between an electrical plug section adjacent the first end and a wiring section adjacent the second end, the second end comprising at least one screw boss connected to the wall of the main body and accessible to the second end, a bezel surrounding an opening at the first end and removably coupled to the first end, a cap configured to removably mount to the bezel within the opening to cover the electrical plug section, at least one extension tube having an outer wall, each of the at least one extension tube having a leading end with at least one leading screw boss connected to the outer wall and accessible to the leading end, and a trailing end with at least one trailing screw boss connected to the outer wall and accessible to the trailing end, the at least one trailing screw boss out of alignment with the at least one leading screw boss, wherein the at least one leading screw boss is configured to align and couple with the at least one boss of the main body, and a back plate having at least one cord receiver aperture extending therethrough and at least one mounting screw aperture extending therethrough, wherein the at least one screw aperture of the back plate is positioned to align with the at least one trailing boss of the at least one extension tube and the at least one cord receiver aperture is configured to allow wiring to extend from the electrical enclosure, wherein the electrical enclosure is configured to assemble with the bezel and cap connected to the first end of the main body, the at least one extension tube leading boss connected to the at least one boss of the second end of the main body with a screw, the back plate connected to the extension tube with a screw through the at least one screw aperture and the at least one trailing boss, and an electrical device coupled to the main body at the electrical device support.

Particular embodiments may comprise one or more of the following features. The at least one extension tube may comprise a first extension tube and a second extension tube and the at least one trailing boss of the first extension tube is configured to align with the at least one leading boss of the second extension tube. The at least one cord receiver aperture may be two cord receiver apertures.

Aspects of this document relate to electrical outlet enclosures which may comprise a tubular main body having a first end and a second end opposite the first end, the main body having an electrical device support extending inward from a wall of the main body between the first end and the second end, the electrical device support defining a separation between an electrical plug section adjacent the first end and a wiring section adjacent the second end, the second end comprising at least one screw boss connected to the wall of the main body and accessible to the second end, a bezel surrounding an opening at the first end and removably coupled to the first end, a cap configured to removably mount to the bezel within the opening to cover the electrical plug section, at least one extension tube having an outer wall, each of the at least one extension tube having a leading end with at least one leading screw boss connected to the outer wall and accessible to the leading end, and a trailing end with at least one trailing screw boss connected to the outer wall and accessible to the trailing end, wherein the at least one leading screw boss is configured to align and couple with the at least one boss of the main body, and a back plate having at least one mounting screw aperture extending therethrough, wherein the at least one screw aperture of the back plate is positioned to align with the at least one trailing boss of the at least one extension tube, wherein the electrical enclosure is configured to assemble with the bezel and cap connected to the first end of the main body, the at least one extension tube leading boss connected to the at least one boss of the second end of the main body with a screw, the back plate connected to the extension tube with a screw through the at least one screw aperture and the at least one trailing boss, and an electrical device coupled to the main body at the electrical device support.

Particular embodiments may comprise one or more of the following features. The at least one extension tube may comprise a first extension tube and a second extension tube and the at least one trailing boss of the first extension tube is configured to align with the at least one leading boss of the second extension tube. Each of the at least one trailing screw boss may be out of alignment with each of the at least one leading screw boss. The back plate may further comprise at least one cord receiver aperture configured to allow wiring to extend through the electrical enclosure. The at least one cord receiver aperture may be two cord receiver apertures.

Aspects of this document relate to electrical outlet enclosures which may comprise a tubular main body having a first end and a second end opposite the first end, the main body having an electrical device support extending inward from a wall of the main body between the first end and the second end, the electrical device support defining a separation between an electrical plug section adjacent the first end and a wiring section adjacent the second end, a bezel surrounding an opening at the first end and removably coupled to the first end, at least one extension tube having an outer wall, each of the at least one extension tube having a leading end and a trailing end, wherein the leading end of one of the at least one extension tube is configured to align and couple with the second end of the main body, and a back plate, wherein the back plate is configured to align and couple with the second end of one of the at least one extension tube, wherein the electrical enclosure is configured to assemble with the bezel connected to the first end of the main body, the leading end of one of the at least one extension tube connected to the second end of the main body, the back plate connected to the trailing end of one of the at least one extension tube, and an electrical device coupled to the main body at the electrical device support.

Particular embodiments may comprise one or more of the following features. The second end of the main body may have at least one screw boss connected to the outer wall and accessible to the second end, the leading end of the at least one extension tube having at least one leading screw boss connected to the outer wall and accessible to the leading end, and the trailing end of the at least one extension tube having at least one trailing screw boss connected to the outer wall and accessible to the trailing end. The at least one screw boss of the second end may be configured to align with the at least one leading screw boss of the at least one extension tube. The back plate may have at least one mounting screw aperture extending therethrough, wherein the at least one screw aperture of the back plate is positioned to align with the at least one trailing boss of the at least one extension tube. The at least one extension tube may comprise a first extension tube and a second extension tube and the at least one trailing boss of the first extension tube is configured to align with the at least one leading boss of the second extension tube. Each of the at least one trailing screw boss may be out of alignment with each of the at least one leading screw boss. The back plate may further comprise at least one cord receiver aperture extending therethrough, configured to allow wiring to extend through the electrical enclosure. The at least one cord receiver aperture may be two cord receiver apertures. A cap configured to removably mount to the bezel within the opening to cover the electrical plug section.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that he can be his own lexicographer if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

This document features an extendable electrical outlet enclosure. There are many features of an electrical enclosure and method implementations disclosed herein, of which one, a plurality, or all features or steps may be used in any particular implementation.

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

Figure 1:
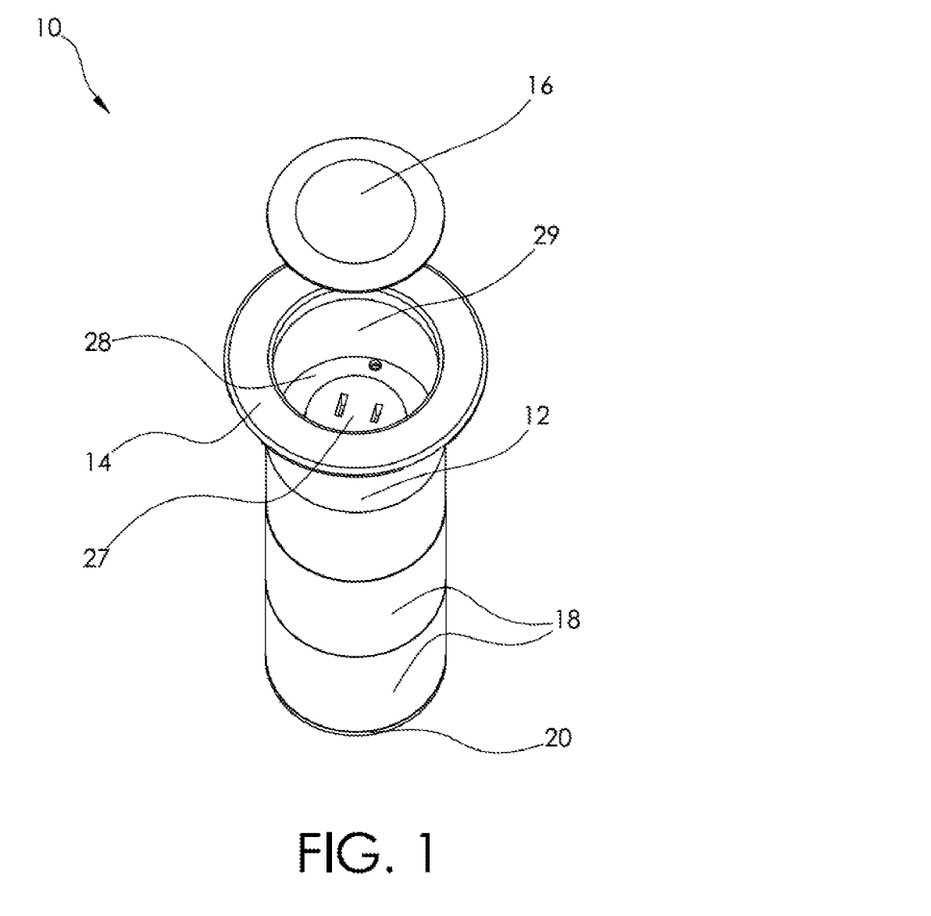
FIG. 1 is a top perspective view of an assembled extendable electrical outlet enclosure with the cap removed.
Figure 2:
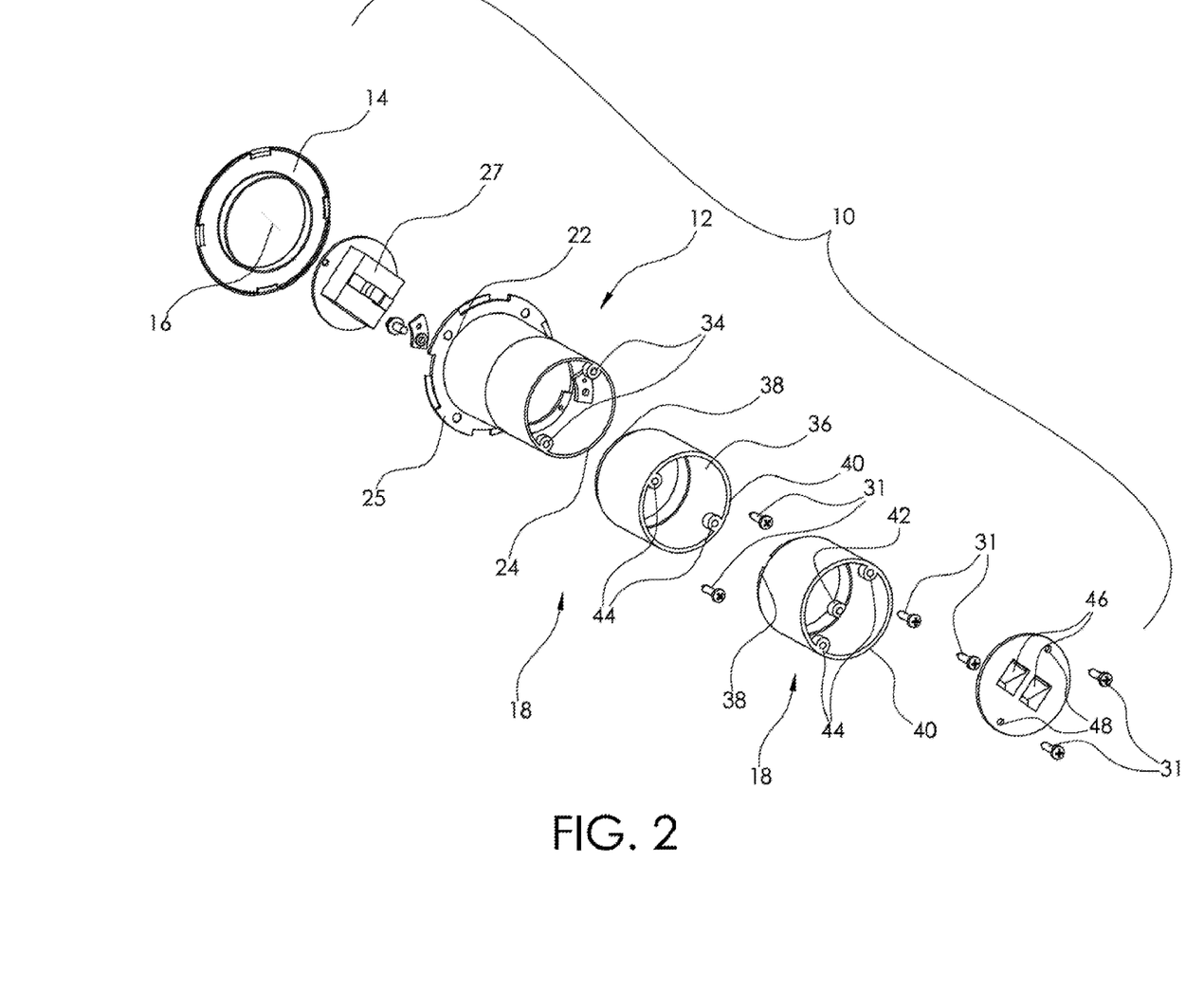
FIG. 2 is an exploded view of the electrical enclosure of FIG. 1.

FIG. 1 depicts a top perspective view of a non-limiting implementation of an extendable electrical outlet enclosure 10. The extendable electrical outlet enclosure 10 is designed to be modular so that a different size extendable electrical enclosure 10 can be implemented in each new situation, depending on the needs of the particular outlet and its location and installation. FIG. 2 shows an exploded view of the electrical enclosure 10 of FIG. 1. In the implementation shown, the electrical enclosure 10 comprises a main body 12, a bezel 14, a cap 16, at least one extension tube 18, and a back plate 20. These main components of the electrical enclosure 10 are configured to align and couple with the bezel 14 and cap 16 connected to a first end 22 of the main body 12 and the at least one extension tube 18 connected to a second end 24 of the main body 12. The back plate 20 is then connected to the at least one extension tube 18. Inside of the main body, an electrical device 27 can be coupled to the main body 12 at an electrical device support 28. Each of the individual components may be coupled with the adjacent component using one or more screws 31.

Figure 3A:
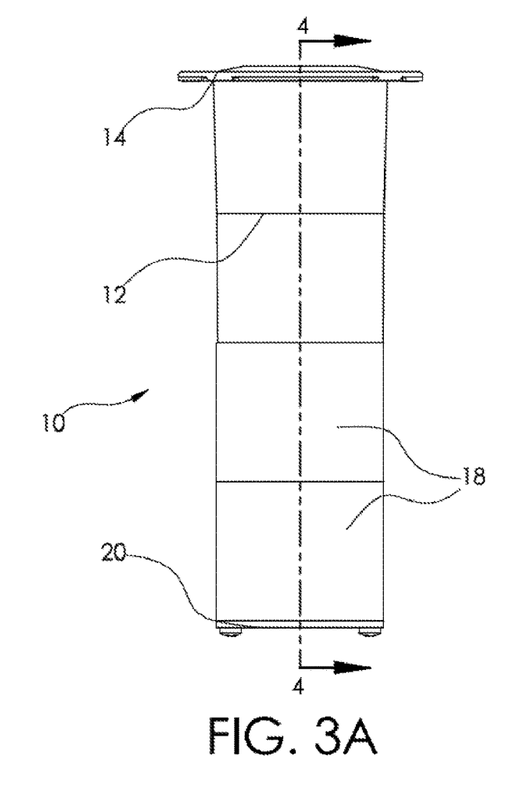
FIG. 3A is a side view of the electrical enclosure of FIG. 1 with the cap in place, showing section lines 4-4.
Figure 3B:
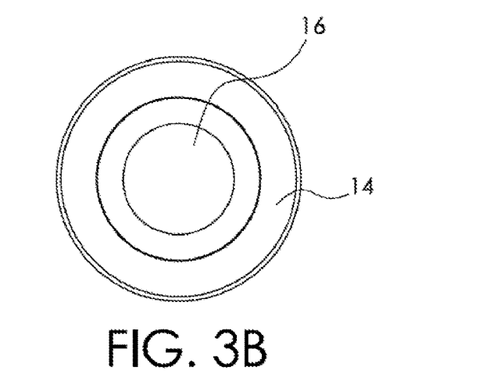
FIG. 3B is a top view of the electrical enclosure of FIG. 3A.
Figure 3C:
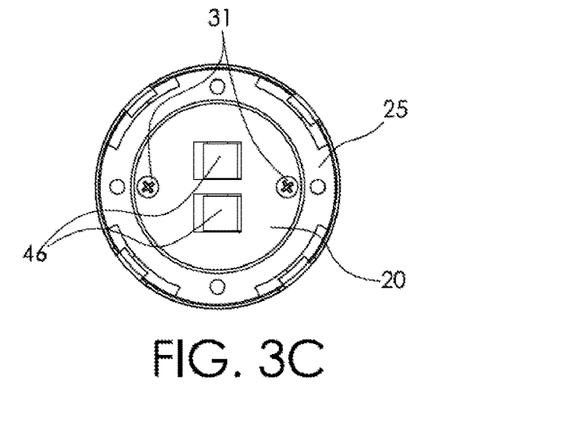
FIG. 3C is a bottom view of electrical enclosure of FIG. 3A.

FIG. 3A shows a side view of the electrical enclosure 10 of FIGS. 1 and 2. The main body 12 has a first end 22 and a second end 24 that is opposite the first end 22. In addition, the main body 12 has a wall 26 that extends between the first end 22 and the second end 24. FIG. 3B shows a top view of the electrical enclosure 10 with the cap 16 in place. The cap 16 functions to obscure a view of the electrical device 27 when the electrical device 27 is not in use by covering an opening 29 of the main body 12. FIG. 3C shows a bottom view of the electrical enclosure 10.

Figure 4:
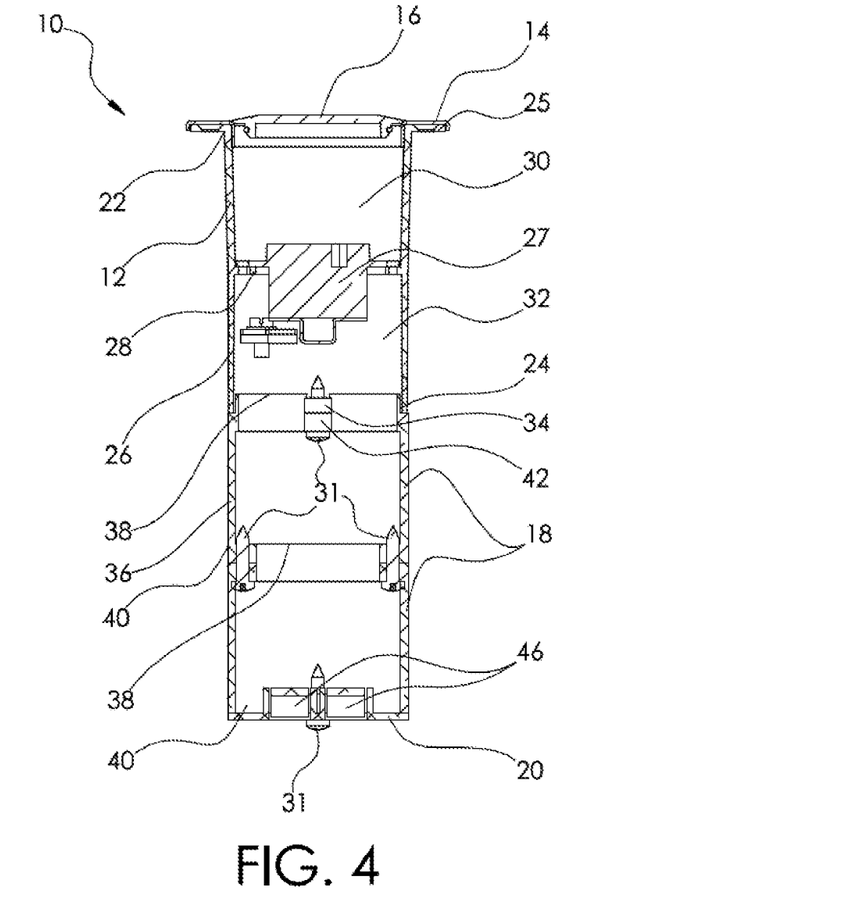
FIG. 4 is section view of the electrical enclosure of FIG. 3A taken along section line 4-4.

FIG. 4 depicts a cross-sectional view of the electrical enclosure 10 taken along the section line 4-4 shown in FIG. 3A, and FIG. 2 depicts an exploded view. The main body 12 may have a bezel support 25 at the first end 22 of the main body 12. The bezel support 25 extends radially outward from the first end 22 and provides a surface to which the bezel 14 is configured to attach, surrounding the opening 29 at the first end 22 of the main body 12. The cap 16 is configured to removably mount to the bezel 14, thus covering the opening 29 when the electrical device 27 is not in use. An electrical device support 28 extends radially inward from the wall 26 towards the center line of the main body 12. The electrical device support 28 defines a separation between an electrical plug section 30 and a wiring section 32. The electrical plug section 30 is adjacent to the first end 22, while the wiring section 32 is adjacent to the second end 24. When an electrical device 27 has been installed within the electrical enclosure 10, an electrical plug can be coupled with the electrical device 27 through the electrical plug section 30. Power may be supplied to the electrical device 27 through wiring that is coupled with the electrical device 27 through the wiring section 32. The main body 12 may have at least one screw boss 34 connected to the wall 26 at the second end 24 (shown in FIG. 2).

The at least one extension tube 18 may be one extension tube, two extension tubes, or more than two extension tubes. Each of the at least one extension tube 18 has an outer wall 36 extending between a leading end 38 and a trailing end 40. The leading end 38 may have at least one leading screw boss 42 connected to the outer wall 36 and accessible at the leading end 38. The trailing end 40 may have at least one trailing screw boss 44 connected to the outer wall 36 and accessible at the trailing end 40. The at least one leading screw boss 42 may be configured to align and couple with the least one screw boss 34 of the main body 12 using a screw 31.

Figure 5:
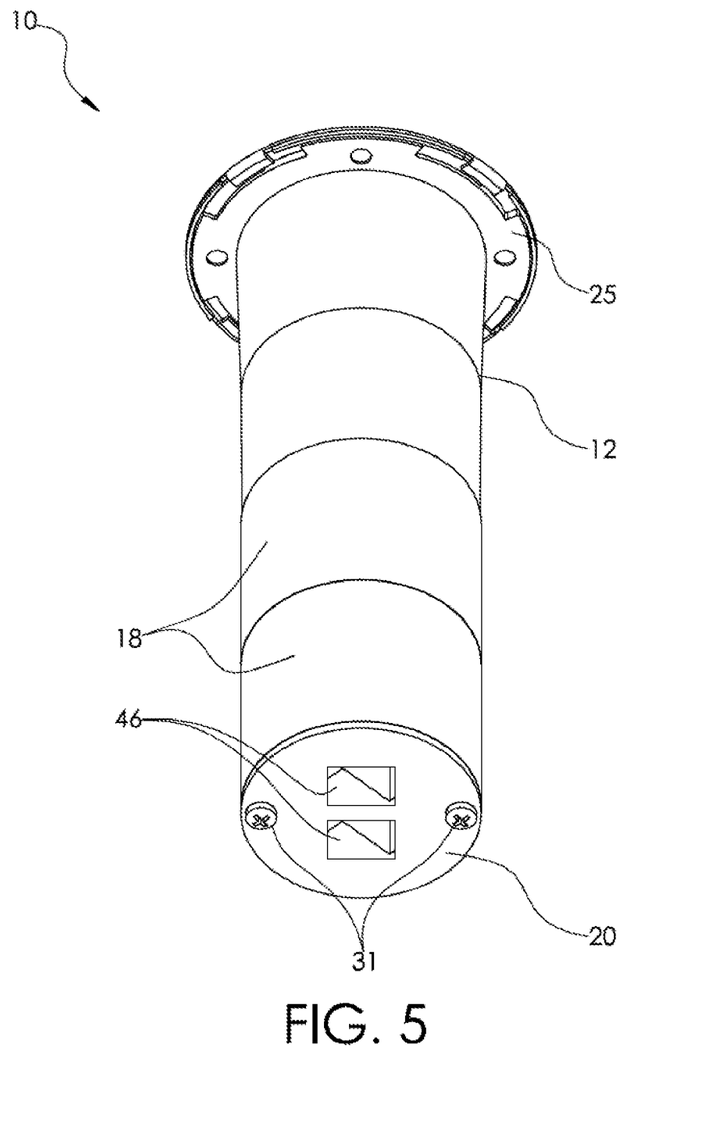
FIG. 5 is a bottom perspective view of the electrical enclosure of FIG. 1.
Figure 6:
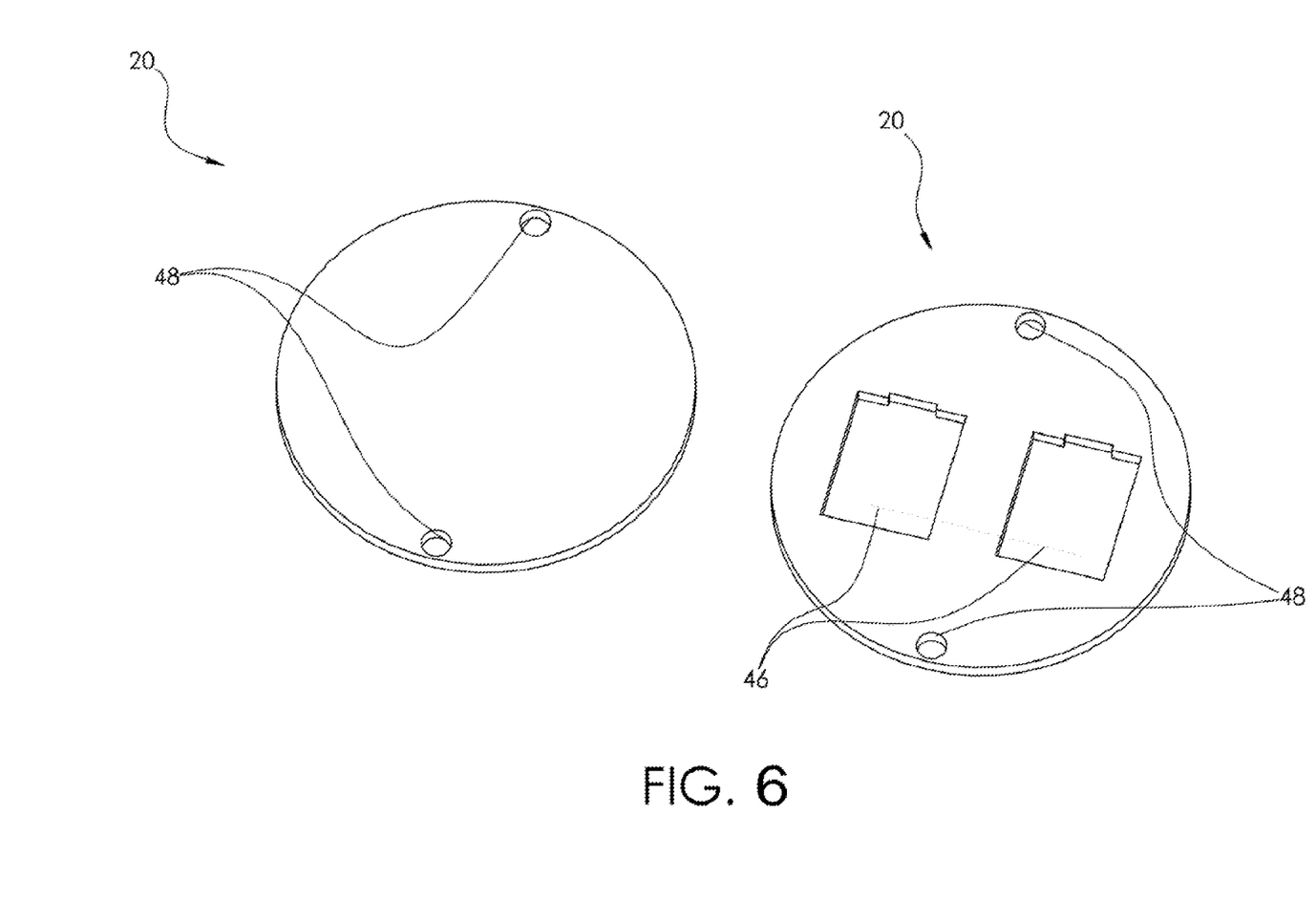
FIG. 6 is a perspective view of two possible implementations of a back plate for the electrical enclosure of FIG. 1 that can be used with any embodiment disclosed in the Application.

The back plate 20 may be the same shape as the cross section of the tubular main body 12 and the at least one extension 18. The back plate 20 may have at least one cord receiver aperture 46 extending therethrough (see also FIG. 5). Alternatively, the back plate 20 may have no cord receiver aperture (see FIG. 6), or exactly two cord receiver apertures 46 (see FIG. 6). The at least one cord receiver aperture 46 is configured to allow wiring to extend from the electrical enclosure 10. The back plate 20 may also have at least one mounting screw aperture 48 extending therethrough. The at least one mounting screw aperture 48 is configured to align with the at least one trailing boss 44 of the at least one extension tube 18.

In implementations having more than one extension tube 18, the leading screw boss 42 of the first extension tube 18 is configured and positioned to align and couple with the at least one screw boss 34 of the main body 12. The leading screw boss 42 of each succeeding extension tube 18 is configured and positioned to align and couple with the at least one trailing screw boss 44 of the preceding extension tube 18. The at least one mounting screw aperture 48 of the back plate 20 is configured and positioned to align and couple with the at least one trailing screw boss 44 of the last extension tube 18. For example, in an implementation with two extension tubes, the at least one leading screw boss 42 of the first extension tube 18 is configured to align and couple with the at least one screw boss 34 of the main body 12, the at least one leading screw boss 42 of the second extension tube 18 is configured to align and couple with the at least one trailing screw boss 44 of the first extension tube 18, and the at least one mounting screw aperture 48 of the back plate 20 is configured to align and couple with the at least one trailing screw boss 44 of the second extension tube 18. In situations where more wiring is attached to the electrical device 27, it is beneficial to have more extension tubes 18 because this creates more space within the electrical enclosure 10 to hold the wiring. Therefore, each specific situation will determine the number of extension tubes 18 that could be used beneficially.

Figure 7:
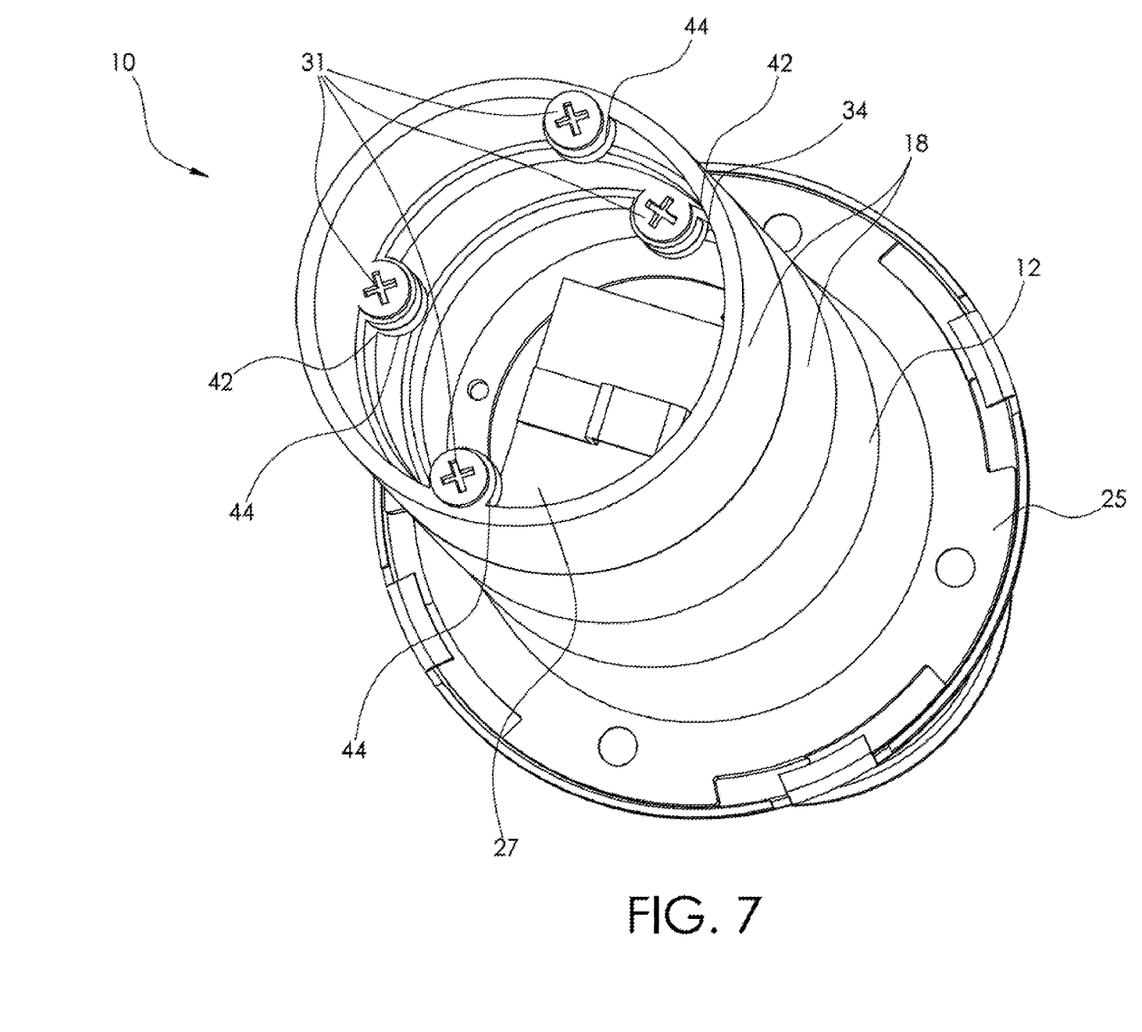
FIG. 7 is a perspective view of the electrical enclosure of FIG. 1 with the back plate removed, showing the internal configuration of an assembled extendable electrical outlet enclosure.

FIG. 7 depicts a perspective bottom view of the electrical enclosure of FIG. 1 with the back 20 plate removed, showing the internal configuration of an assembled electrical enclosure 10. In the implementation shown, each extension tube 18 has leading screw bosses 42 that are out of alignment with the trailing screw bosses 44 of the same extension tube 18. This allows easier access to the leading screw bosses 42 with a tool when the electrical enclosure 10 is assembled.

In a particular use example, an electrical outlet enclosure 10 for in-floor installation is to be installed into a floor. In a first installation, the floor is shallow, for example, framed with only 2×4 studs or to be formed with a shallow concrete pour, and an installer does not have a lot of room to install the electrical outlet enclosure 10. In this first situation, the installer uses only the main body 12, bezel 14, cap 16, the back plate 20 with cord receiver apertures 46, and at least one screw 31 to attach the back plate 20 to the at least one screw boss 34 of the main body 12. In a second installation, the floor is a little deeper and more space is needed within the electrical outlet enclosure 10, for example framed with 2×6 studs or to be formed with a deeper concrete pour. In this second situation, the installer could use the main body 12, bezel 14, cap 16, a first extension tube 18, the back plate 20 with cord receiver apertures 46, and a screw 31 to attach the extension tube 18 leading screw boss 42 to the screw boss 34 of the main body 12, and a screw 31 to attach the back plate 20 to the trailing screw boss 44 of the extension tube. In a third installation, for example, the floor is deep and an installer has plenty of room for whatever depth of the electrical outlet enclosure 10 the installer desires. In this third situation, the installer could use the main body 12, bezel 14, cap 16, two or more extension tubes 18, the back plate 20 with cord receiver apertures 46, and the screws 31 to attach the extension tubes 18 leading screw boss 42 to the screw boss 34 of the main body 12 and to the trailing screw boss 44 of the extension tube(s) respectively, and a screw 31 to attach the back plate 20 to the trailing screw boss 44 of the extension tube. Although the embodiments illustrated show only two extension tubes 18, and it is currently contemplated that most products sold will include two extension tubes 18, it will be understood by those of ordinary skill in the art that one or more extension tubes 18 may be used and in particular installations, it may be desirable to use three or even four or more extension tubes 18 for an installation, attaching them to each other to form the electrical outlet enclosure 10 as the first two are attached and described herein.

It will be understood that extendable electrical enclosure implementations are not limited to the specific assemblies, devices and components disclosed in this document, as virtually any assemblies, devices and components consistent with the intended operation of an extendable electrical enclosure may be utilized. Accordingly, for example, although particular electrical enclosures, covers, lids, sleeves, latches, snap-fit couplers, hinges, frames, enclosures, bubble covers, housings, joints, protrusions, ledges, clamps, grooves, ridges, couplers, fasteners, power sockets, and other assemblies, devices and components are disclosed, such may include any shape, size, style, type, model, version, class, measurement, concentration, material, weight, quantity, and/or the like consistent with the intended operation of an electrical enclosure implementation. Implementations are not limited to uses of any specific assemblies, devices and components; provided that the assemblies, devices and components selected are consistent with the intended operation of an extendable electrical enclosure.

Accordingly, the components defining any electrical enclosure implementations may be formed of any of many different types of materials or combinations thereof that can readily be formed into shaped objects provided that the components selected are consistent with the intended operation of an electrical enclosure implementation. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof.

For the exemplary purposes of this disclosure, sizing, dimensions, and angles of electrical enclosure implementations may vary according to different implementations.

Various electrical enclosure implementations may be manufactured using conventional procedures as added to and improved upon through the procedures described here. Some components defining electrical enclosure implementations may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that the assembly of extendable electrical enclosures are not limited to the specific order of steps as disclosed in this document. Any steps or sequence of steps of the assembly of electrical enclosures indicated herein are given as examples of possible steps or sequence of steps and not as limitations, since various assembly processes and sequences of steps may be used to assemble electrical enclosures.

The electrical enclosure implementations described are by way of example or explanation and not by way of limitation. Rather, any description relating to the foregoing is for the exemplary purposes of this disclosure, and implementations may also be used with similar results for a variety of other applications requiring an extendable electrical enclosure.

What is claimed is:
1. An electrical enclosure, comprising:
   a tubular main body configured to support an electrical device, the main body having a first end and a second end opposite the first end, the second end comprising at least one screw boss connected to a wall of the main body and accessible from the second end;

a cap configured to removably cover an opening at the first end;

at least one extension tube having an outer wall, each of the at least one extension tube having a leading end with at least one leading screw boss connected to the outer wall and accessible from the leading end, and a trailing end with at least one trailing screw boss connected to the outer wall and accessible from the trailing end, the at least one trailing screw boss out of alignment with the at least one leading screw boss, wherein the at least one leading screw boss is configured to align and couple with the at least one screw boss of the main body; and a back plate having at least one mounting screw aperture extending therethrough, wherein the at least one screw aperture of the back plate is positioned to align with the at least one trailing screw boss of the at least one extension tube.

2. The electrical enclosure of claim 1, the main body further having an electrical device support extending inward from a wall of the main body between the first end and the second end, the electrical device support defining a separation between an electrical plug section adjacent the first end and a wiring section adjacent the second end.

3. The electrical enclosure of claim 1, wherein each of the at least one trailing screw boss is out of alignment with each of the at least one leading screw boss.

4. The electrical enclosure of claim 1, the back plate further having at least one cord receiver aperture extending therethrough configured to allow wiring to extend into the electrical enclosure.

5. An electrical enclosure, comprising:

a main body having a first end, a second end opposite the first end, and an electrical device support extending inward from a wall of the main body between the first end and the second end, the electrical device support defining a separation between an electrical plug section adjacent the first end and a wiring section adjacent the second end;

a cap configured to removably cover an opening at the first end;

at least one extension tube having an outer wall, each of the at least one extension tube having a leading end and a trailing end, wherein the leading end of one of the at least one extension tube is configured to align and couple with the second end of the main body; and a back plate, wherein the back plate is configured to align and couple with the second end of one of the at least one extension tube.

6. The electrical enclosure of claim 5, the second end of the main body having at least one screw boss connected to the wall of the main body and accessible from the second end, the leading end of the at least one extension tube having at least one leading screw boss connected to the outer wall and accessible from the leading end, and the trailing end of the at least one extension tube having at least one trailing screw boss connected to the outer wall and accessible from the trailing end.

7. The electrical enclosure of claim 6, wherein the at least one screw boss of the second end is configured to align with the at least one leading screw boss of the at least one extension tube.

8. The electrical enclosure of claim 6, the back plate having at least one mounting screw aperture extending therethrough, wherein the at least one screw aperture of the back plate is positioned to align with the at least one trailing screw boss of the at least one extension tube.

9. The electrical enclosure of claim 5, wherein each of the at least one trailing screw boss is out of alignment with each of the at least one leading screw boss.

10. The electrical enclosure of claim 5, the back plate having at least one cord receiver aperture extending therethrough configured to allow wiring to extend into the electrical enclosure.

11. An electrical enclosure, comprising:

a main body configured to support an electrical device, the main body having a first end with an opening and a second end opposite the first end;

at least one extension tube having an outer wall, each of the at least one extension tube having a leading end and a trailing end, wherein the leading end of one of the at least one extension tube is configured to align and couple with the second end of the main body; and a back plate, wherein the back plate is configured to align and couple with the second end of one of the at least one extension tube.

12. The electrical enclosure of claim 11, the main body having an electrical device support extending inward from a wall of the main body between the first end and the second end, the electrical device support defining a separation between an electrical plug section adjacent the first end and a wiring section adjacent the second end.

13. The electrical enclosure of claim 11, further comprising a cap configured to removably cover the opening at the first end.

14. The electrical enclosure of claim 11, further comprising a bezel surrounding the opening and removably coupled to the first end.

15. The electrical enclosure of claim 11, the main body further having an electrical device support extending inward from a wall of the main body between the first end and the second end, the electrical device support defining a separation between an electrical plug section adjacent the first end and a wiring section adjacent the second end.

16. The electrical enclosure of claim 11, wherein each of the at least one trailing screw boss is out of alignment with each of the at least one leading screw boss.

17. The electrical enclosure of claim 11, the back plate having at least one cord receiver aperture extending therethrough configured to allow wiring to extend into the electrical enclosure.

18. The electrical enclosure of claim 11, the second end of the main body having at least one screw boss connected to the wall of the main body and accessible from the second end, the leading end of the at least one extension tube having at least one leading screw boss connected to the outer wall and accessible from the leading end, and the trailing end of the at least one extension tube having at least one trailing screw boss connected to the outer wall and accessible from the trailing end.

19. The electrical enclosure of claim 18, wherein the at least one screw boss of the second end is configured to align with the at least one leading screw boss of the at least one extension tube.

20. The electrical enclosure of claim 18, the back plate having at least one mounting screw aperture extending therethrough, wherein the at least one screw aperture of the back plate is positioned to align with the at least one trailing screw boss of the at least one extension tube.

\* \* \* \* \*